June 20, 1961
F. G. WEIS
2,989,186
DIFFUSER ASSEMBLY FOR SEWAGE DISPOSAL PLANTS
Filed June 6, 1958
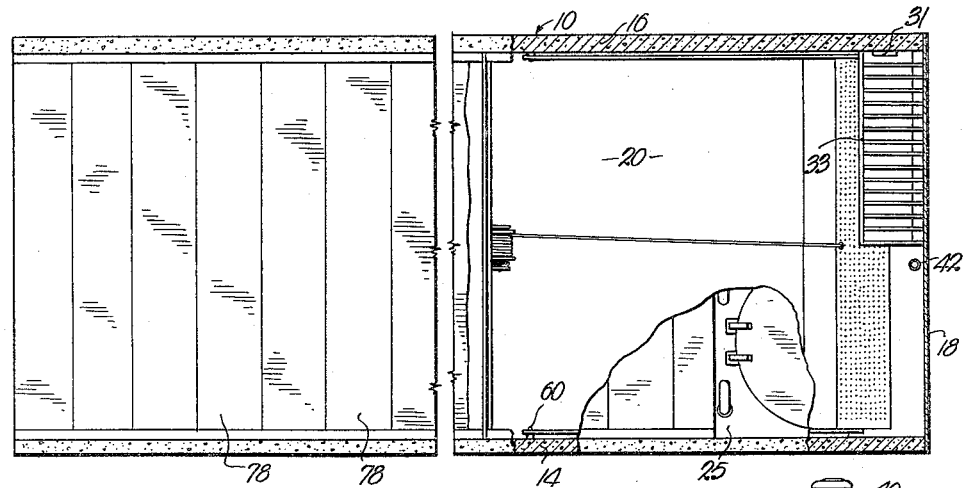
Fig. 1.
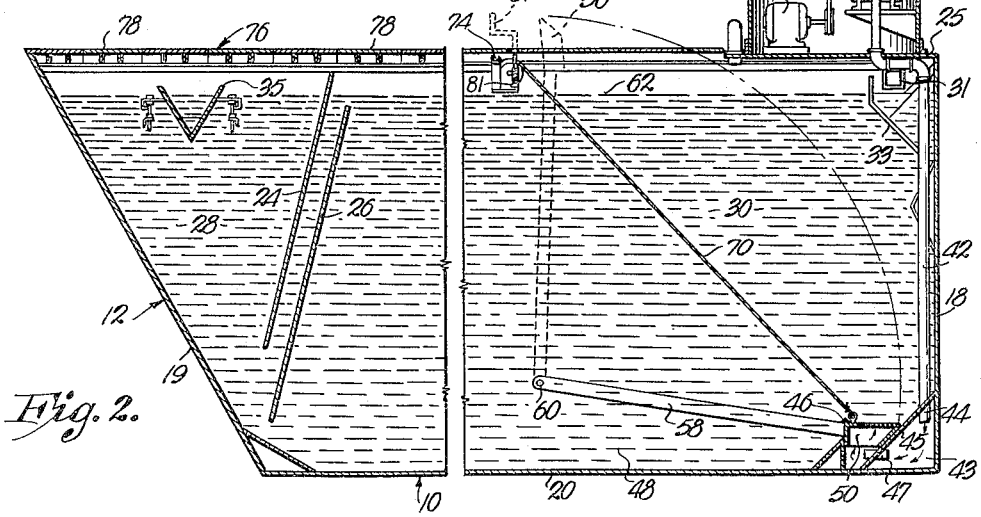
Fig. 2.
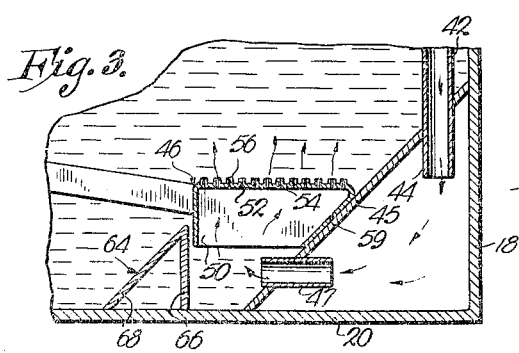
Fig. 3.
Fig. 4.
INVENTOR.
Frank G. Weis
BY
ATTORNEY.

%
United States Patent Office 2,989,186
Patented June 20, 1961

2,989,186
DIFFUSER ASSEMBLY FOR SEWAGE DISPOSAL PLANTS
Frank G. Weis, Kansas City, Mo., assignor, by mesne assignments, to Union Tank Car Company, Chicago, Ill., a corporation of New Jersey
Filed June 6, 1958, Ser. No. 740,279
1 Claim. (Cl. 210—150)

This invention relates to the field of treating liquid or substantially liquid materials with a gaseous substance in a manner adapted to effect absorption of the gas into the liquid for "aeration" of the liquid material depending upon the particular gas that is employed.

In particular, the instant invention is concerned with the provision of a system for treating sewage with air in order to aerate the same, and the system includes a novel diffuser assembly for assuring distribution of air introduced into the sewage tank over a relatively large area of the liquid or substantially liquid material within the tank and constructed to subdivide the gaseous substance, such as air, for subsequent ascension into the sewage and at least partial absorption thereinto. Although aeration systems for treatment of sewage have been heretofore provided, these prior systems have not been satisfactory primarily because of the fact that the relatively solid components of the sewage tend to gravitate toward the lowermost end of the sewage tank and thus, clog up and seriously decrease the efficient release of the air into the sewage in a relatively short period of time after commencement of operation of the system.

It has been recognized that in order to obtain maximum diffusion of the gaseous substance into the liquid sewage in the tank, it is necessary to use some type of air distribution apparatus but, because of the sludge problem noted above, the prior diffusion apparatus has not been as efficient as would otherwise be the case if there were no solid components in the sewage material, inasmuch as it has been the usual practice to design the air diffuser so that maximum operational life is obtained before the tank must be drained of sewage and the diffuser removed for cleaning or replacement purposes. Thus, most of the prior diffusers have necessarily been constructed with the air orifices thereof of maximum practical diameter so that clogging of such orifices with the solid components of the sewage is retarded for the longest practical period of time. However, utilization of diffusers having relatively large orifices did not give the most efficient aeration results inasmuch as the air was not subdivided into fine streams necessary to produce maximum absorption of the air into the sewage.

Because of the inefficient operation of the diffusers described above, many sanitation equipment designers employed diffusers which gave maximum distribution of the air into the sewage and then instructed operators of the plant to clean such diffusers at frequent intervals in order to assure the most efficient distribution of the air into the sewage within the tank. This procedure was costly and inconvenient because of the fact that the tank had to be completely drained of all sewage materials, inasmuch as the diffuser is necessarily located at the bottom of the tank, and then it was necessary for workmen to descend into such tank in order to clean, repair or replace the diffuser. Even this procedure was hampered by the fact that the bottom of the tank most usually contained a relatively thick layer of sludge which had settled out of the sewage by virtue of inadequate aeration caused by clogging of the air diffuser, and it was oftentimes necessary to remove such sludge from the bottom of the tank before the diffuser could be cleaned.

Complete removal of the air diffuser from the bottom of the tank for purposes of cleaning or repair was not a satisfactory solution to the problem because of the necessity of completely draining the sewage tank and then subsequently, descending into the tank to attach suitable means to the diffuser for pulling the same out of the tank from a point above the latter. Again, it can be recognized that this process was time consuming and necessitated complete shutdown of the sewage treating plant. Because of the importance of maintaining the sewage treatment system in operation at all times, oftentimes cleaning of the diffuser assembly was delayed well beyond the time when such diffuser ceased operating at even practical efficiency and thus, the liquid sewage within the tank was not properly aerated.

Another attempt to solve the problem involved mounting a diffuser on one end of an articulated air conducting pipe extending downwardly into the treatment tank, the lower section of the conduit being hingedly mounted on the upper section so that the diffuser could be raised to the surface of the sewage material upon swinging of the lower section in an arc of approximately 180°. This system, although alleviating the cleaning problem to some degree, was not of commercial advantage because the size of the diffuser itself was greatly limited since the weight thereof was entirely supported by the upper section of the conduit during lowering and raising of the same, and maintenance of the swing joint was expensive and never satisfactorily solved. Furthermore, the entire unit was heavy, cumbersome, relatively inefficient and expensive in overall cost and fabrication.

It is, therefore, the most important object of this invention to provide an efficient, inexpensive system for treating sewage with gaseous substance wherein the diffuser assembly may be quickly swung from its normal position within the tank to a location above the surface of the sewage for cleaning and repair operations, without the necessity of draining the liquid sewage from the tank or of closing down operation of the treating system.

It is a further important object of this invention to provide such a system wherein the diffuser is normally positioned within the tank in overlying relationship to a separate air outlet pipe and is secured to arms pivotally mounted on the walls of the tank adjacent the bottom thereof and of sufficient length that upon swinging movement of the diffuser to the uppermost end of its path of travel about the pivotal mount of the arms, the diffuser clears the surface level of the liquid sewage within the tank so that the diffuser may be readily cleaned or repaired as required.

A further important object of the invention is to provide a system as referred to above wherein a stainless steel cable is secured to the diffuser and extends upwardly out of the liquid sewage to a hand winch adjacent the upper edge of the tank, so that the diffuser may be readily swung upwardly to the uppermost end of its path of travel with a minimum of effort by an operator turning the crank handle of the winch from a point outside of the treatment tank.

An additional important object of the instant invention is to provide a system for treating sewage wherein is included stop means at the bottom of the tank for maintaining the diffuser in its normal position overlying the air outlet into the tank and which extends the width of such tank and thereby serves as a baffle to improve flow of the liquid sewage over the gas diffuser assembly and furthermore, prevent depositions of sludge material in the adjacent corner of the tank.

Other important objects of this invention relate to the provision of a treatment tank having a removable cover section over the open top thereof so that the diffuser assembly may be readily cleaned by merely removing a section of the top over the tank and then subsequently, swinging the diffuser to a position above the level of the liquid sewage; to the provision of a diffuser assembly swingably mounted on the tank, as described above, which may be swung upwardly to a position adjacent a portion of the cover section closing a part of the open top of the tank, to the end that workmen may clean the elongated diffuser from a position on the cover; to the provision of a diffuser assembly wherein the orifices in the uppermost surface thereof for subdividing the air into a plurality of streams have "Teflon" inserts or the like therein so that cleaning and/or repair of the diffuser may be effected in a minimum period of time; and to other important objects and salient features of the instant invention which will become obvious or be explained more fully as the following specification progresses.

In the drawing:

FIGURE 1 is a fragmentary plan view of a system for treating sewage as contemplated by the present invention, with certain parts thereof being broken away and in section to reveal details of construction;

FIG. 2 is a side elevational view of the treating system illustrated in FIG. 1, with certain components thereof broken away along vertical planes to reveal the novel construction of the invention;

FIG. 3 is a fragmentary, enlarged, sectional view of the diffuser assembly forming a part of the instant invention; and FIG. 4 is a fragmentary, enlarged, elevational view of the winch apparatus employed in the preferred embodiment of the invention.

Briefly, the novel sewage treating system as now provided includes an open-top liquid receiving tank adapted to contain sewage influent and which preferably includes a primary aeration area and a settling section divided by an intermediate wall. Means are provided adjacent the top of the tank for directing a gaseous substance such as air under pressure to a point of discharge within the tank below the surface level of liquid sewage contained in the same and, in this connection, includes a conduit communicating with the tank adjacent the bottom thereof for delivering the air to the liquid sewage material. A diffuser is disposed in overlying relationship to the outlet of the air conduit and is adapted for distributing the gaseous substance to a relatively large area of the liquid sewage and subdividing the same for subsequent ascension and absorption into the sewage. Arms are secured at corresponding ends thereof to each of opposed ends of the diffuser and are pivotally mounted on opposed sides of the tank at the ends thereof remote from the diffuser. The arms are of sufficient length to cause the diffuser to clear the upper level of the liquid sewage when the diffuser is swung to the uppermost end of its path of travel. A stainless steel cable or the like is attached to the diffuser and extends upwardly through the liquid sewage to a hand operated winch adjacent the upper edge of the tank for facilitating swinging of the diffuser to a point above the level of the liquid material. A pair of elongated baffles extend across the width of the tank adjacent the air outlet conduit, one of the baffles serving to maintain the diffuser in a predetermined position above the air conduit, preventing settling of solids below the diffuser and also retarding loss of air or other gaseous substance around the sides of the diffuser, and the other baffle being disposed to improve flow of sewage influent over the air diffuser.

A system for treating sewage with a gaseous substance is illustrated in the drawing in its preferred form and is broadly designated therein by the numeral 10. System 10 includes a relatively large, open-top, liquid sewage receiving tank broadly numerated 12 and most usually disposed in a partially submerged position in the ground. Tank 12 is preferably constructed of steel reinforced concrete or similar materials and includes a pair of rectangular side walls 14 and 16 in opposed relationship, as well as opposed end walls 18 and 19, wall 19 being disposed in an inclined position from the vertical as shown in FIG. 2. Bottom wall 20 closes the lower end of tank 12 while the uppermost end thereof is entirely open except at one end thereof, as will be more fully described hereinafter. A pair of angularly disposed, spaced partitions 24 and 26 extending between walls 14 and 16 subdivide tank 12 into a settling basin 28 and an aeration compartment 30. Sewage influent enters compartment 30 through inlet 31 of tank 12 within distributing flume 33, and basin 28 and compartment 30 are in intercommunication so that after aeration, such influent may pass from compartment 30 over the upper edge of partition 26 and thence downwardly between partitions 24 and 26 into basin 28. The effluent from basin 28 overflows weir 35 for passage from tank 12.

Means for directing gaseous substance such as air under pressure to a point of discharge within tank 12 is mounted on the cover plate 25 disposed in overlying relationship to the upper corner of tank 12 defined by the upper margins of walls 14 and 18 and is positioned within a housing 32 mounted on plate 25. A blower 34 mounted within housing 32 is operably coupled with and driven by an electrical motor 36 and communicates with the atmosphere through an air inlet tube 38 having an air cleaner 40 at the outermost end thereof, and with tank 12 through a vertical gas conduit 42 passing downwardly from the corner of plate 25 adjacent flume 33 and in close proximity to wall 18. As illustrated in FIG. 2, the lower end 44 of conduit 42 terminates adjacent bottom wall 20 and extends into a closed chamber 43 defined by portions of end wall 18, bottom wall 20 and a baffle 45 positioned angularly across the corner of tank 12 and extending substantially the width of the latter between side walls 14 and 16. A relatively short, horizontally disposed outlet pipe 47 welded in baffle 45 medianly between walls 14 and 16 intercommunicates chamber 43 and compartment 30.

A diffuser assembly broadly designated 46 is disposed within tank 12 and adapted for distributing the air passing from outlet pipe 47 to a relatively large area of the liquid sewage influent 48 within compartment 30, and for subdividing the air into relatively fine streams for subsequent ascension and absorption into influent 48. Diffuser assembly 46 includes an air diffuser 50 closed at the top and sides thereof and open at the bottom, as clearly shown in FIG. 3, and which has a relatively large number of air passages 52 in the normally horizontal, upper wall 54 thereof. In order to assure a long useful life of diffuser 50, cylindrical "Teflon" inserts 56 may be disposed in each of the air passages 52.

As clearly shown in FIG. 1, diffuser 50 extends substantially the width of tank 12 and directly overlies the outlet end of pipe 47 for distributing the air passing therefrom to a relatively large area of influent 48 within compartment 30.

An arm 58 is joined to each of opposed ends of diffuser 50 and, as indicated in FIGS. 1 and 2, the ends of arms 58 remote from diffuser 50 are pivotally mounted by bolt means 60 on corresponding inner surfaces of walls 14 and 16. Thus, diffuser 50 is adapted to be swung about the pivotal mounting points of each of the arms 58 and in this respect, it is to be pointed out that arms 58 are swingable about a common horizontal axis and are of sufficient length that when diffuser 50 is swung to the uppermost end of its path of travel, as indicated in dotted lines in FIG. 2, diffuser 50 clears the upper surface level 62 of material 48 within compartment 30. It is to be preferred, however, that arms 58 be of such length that diffuser 50 is disposed slightly above the upper edge of tank 12 when at the uppermost end of its path of travel.

A transversely V-shaped baffle 64 is secured to the upper face of bottom wall 20 adjacent end wall 18 and includes a substantially upright, rectangular plate portion 66 in perpendicular relationship to the axis of outlet pipe 47 of conduit 42, as well as an integral, angularly disposed leg 68 in substantial parallelism with baffle 45 and serving to maintain baffle plate portion 66 in proper disposition. As shown in FIG. 3, baffle 64 is disposed in sufficient proximity to the outlet end of pipe 47 that the upright baffle plate 66 thereof serves to retard loss of air around the sides of diffuser 50 and also serves to prevent sludge and other solid components from influent 48 from passing into the area beneath diffuser 50 adjacent the end 44 of conduit 42. The rear wall portion 59 of diffuser 50 is angled to correspond with the angular configuration of baffle 45 and wall 59 engages the upper face of baffle 45 when diffuser 50 is at the lower end of its path of travel to thereby maintain the same in its operable position in directly overlying relationship to outlet pipe 47.

An elongated stainless steel cable 70 is secured to the upper face of wall 54 of diffuser 50 and extends upwardly therefrom through influent 48 to a hand operated winch 74 for facilitating swinging of diffuser assembly 46 to the uppermost end of its path of travel. Winch 74 is mounted on a bracket plate 75 suspended from a horizontal angle rod 77 extending transversely of tank 12 between walls 14 and 16 by a pair of bracket arms 79. Plate 75 is located midway between walls 14 and 16 and serves to mount end plates 81 of winch 74, plates 81 in turn rotatably supporting cylinder 83 receiving cable 70. Means for rotating cylinder 83 includes worm and gear means 85 adapted to be operated with a vertical drive handle 87.

The open top of tank 12 is normally closed with a cover 76 formed of a series of proximal, abutting, corrugated sections 78 so that access may be had to basin 28 and compartment 30 without the necessity of removing all of the sections thereof.

The manner in which system 10 is utilized to treat sewage influent is apparent from the description above but it is to be noted that such influent is initially directed into flume 33 through inlet 31, whereupon the same gravitates into compartment 30 where the greatest proportion of the solid components thereof are broken down and oxidized by the aeration process carried out in such compartment. The substantially liquid influent 48 within compartment 30 is subjected to aeration by virtue of blower 34 directing air under pressure from air inlet cleaner 40 through inlet tube 38, thence through conduit 42 to chamber 43 for discharge through pipe 47 as blower 34 is operated by motor 36.

The air under pressure passing from chamber 43 through outlet pipe 47 passes upwardly into diffuser 50 and is distributed throughout the width of tank 12 and subdivided into fine streams for ascension and absorption into sewage influent 48. Baffle 64 serves to retard loss of gaseous substance or air around the sides of diffuser 50 and also prevents any sludge settling out in compartment 30 from passing into the area beneath diffuser 50 and adjacent the outlet end 44 of conduit 42. Baffle plate 45 serves to improve flow of the sewage influent over diffuser 50 and prevent solid components in the influent from lodging in the corner of tank 12 defined by wall 18 and bottom 20.

The treated influent 48 from compartment 30 overflows the uppermost edge of partition 26 into basin 28 for subsequent passage from the latter, and any untreated solid components settle out in basin 28 and pass through a suitable inlet at the bottom of partition 26 into compartment 30 where the same are again subjected to the aeration treatment.

After system 10 has been in operation for an extended period of time, the passages 52 and in particular the bores of "Teflon" or other types of inserts 56 tend to clog up with solid components and thus decrease the aeration efficiency of assembly 46. Thus, in order to clean assembly 46, it is only necessary to remove certain of the sections of cover 76 and thereupon operate winch 74, to which cable 70 is attached, to swing assembly 46 upwardly to a position as shown in dotted lines in FIG. 2 from a point outside of tank 12. In the upright position as shown, assembly 46 may be readily cleaned and the air passages unclogged or new inserts placed in the same if necessary. It can be appreciated that because of the provision of sectional cover plates 76, workmen may clean diffuser 50 from a position on such cover sections if necessary.

By utilization of a diffuser assembly 46 swingably mounted on the side walls 14 and 16 of tank 12, the diffuser 50 thereof may be readily cleaned or repaired without the necessity of draining influent from tank 12 or of workmen descending into tank 12 to the bottom thereof where the diffuser assembly is located. Another feature of the instant assembly is the provision of a gas diffuser that extends the full width of tank 12, thereby increasing the aeration efficiency of the unit. This increase in the degree of aeration is accomplished without the utilization of heavy, cumbersome equipment that is expensive in initial cost as well as maintenance and furthermore, the actual diffuser is maintained separate from the fluid inlet conduit so that only the diffuser itself need be raised and lowered for cleaning and repair purposes.

Baffle 45 also serves the important function of limiting downward movement of assembly 46 and therefore, proper disposition of diffuser 50 over outlet end of pipe 47 is assured upon lowering of assembly 46 to its normal position within tank 12.

Having thus described the invention what is claimed as new and desired to be secured by Letters Patent is:

In a system for treating sewage with a gaseous substance, the combination of an open top tank adapted to hold a quantity of sewage and having upright side wall structure and a bottom wall; stationary conduit means extending through the side wall structure adjacent said bottom wall, communicating with the interior of the tank and adapted to convey said gaseous substance under pressure to a fixed point of discharge within the tank below the surface level of said quantity of sewage; an elongated, generally horizontally disposed diffusion member of inverted pan-shaped configuration and having a planar top portion and a downwardly extending side wall portion integral with and extending around the entire periphery of the top portion, said diffusion member substantially spanning the distance between opposed surfaces of said side wall structure in direct overlying relationship to the discharge end of said conduit means whereby the gaseous substance emanating from said discharge end of the conduit means is collected under said diffusion member, said top portion of the diffusion member being provided with a series of gas distribution openings therein whereby the substance after collection in said diffusion member is subdivided and permitted to ascend through the openings into the main body of the sewage over a relatively large area of the latter; a pair of of elongated elements each secured at one end thereof to corresponding opposite ends of the diffusion member; means pivotally mounting the opposite ends of said elements on said opposed surfaces of the side wall structure for swinging movement about a horizontal axis, said elements being of sufficient length to cause the diffusion member to be disposed above the level of the sewage in the tank upon swinging movement of the elements from a substantially horizontal position to a generally upright disposition; upright baffle means on said bottom wall of the tank adjacent said discharge end of the conduit means, extending the full length of and parallel with said member and disposed to retard escape of gas from beneath said diffusion member and to preclude accumulation of sludge below the diffusion member; support means extending across the central part of the tank above the level of the sewage therein and positioned substantially above the axis of pivoting of said elements; winch means carried by said support means; and flexible cable means secured to the diffusion member and trained over said winch means whereby the diffusion member may be easily raised to a position above the sewage level in the tank for cleaning and repair thereof.

References Cited in the file of this patent

UNITED STATES PATENTS

| | | |
|---|---|---|
| 2,040,941 | Jones et al. | May 19, 1936 |
| 2,144,385 | Nordell | Jan. 17, 1939 |
| 2,774,585 | Wirts | Dec. 18, 1956 |

FOREIGN PATENTS

| | | |
|---|---|---|
| 20,259 | Great Britain | of 1914 |